United States Patent [19]

Hawk

[11] 4,156,436

[45] May 29, 1979

[54] SUPPORT SYSTEM FOR FLEXIBLE CONDUITS

[75] Inventor: Dale W. Hawk, Springfield, Ill.

[73] Assignee: Fiat-Allis Construction Machinery, Inc., Deerfield, Ill.

[21] Appl. No.: 825,864

[22] Filed: Aug. 19, 1977

[51] Int. Cl.² ............................................. F16L 13/04
[52] U.S. Cl. ................................ 137/344; 137/355.17; 280/421; 285/62; 248/68 R
[58] Field of Search .............. 137/344, 355.16, 355.17; 280/421, 422; 285/62; 137 R; 248/51, 52, 54 R, 68 R; 24/81 CC

[56] References Cited

U.S. PATENT DOCUMENTS

| | | | |
|---|---|---|---|
| 2,619,888 | 12/1952 | Young et al. | 280/421 |
| 3,385,545 | 5/1968 | Patton | 248/68 R |
| 3,722,916 | 3/1973 | Muntjanoff | 280/421 |
| 3,872,881 | 3/1975 | Miller et al. | 137/355.17 |
| 3,882,886 | 5/1975 | Ely et al. | 137/344 |
| 3,885,816 | 5/1975 | Miller et al. | 137/355.17 |
| 3,901,270 | 8/1975 | Smith | 137/355.17 |

Primary Examiner—Martin P. Schwadron
Assistant Examiner—A. Michael Chambers
Attorney, Agent, or Firm—August E. Roehrig, Jr.; Robert A. Brown; Harvey W. Rockwell

[57] ABSTRACT

A shackle system for connection of control lines such as high-pressure hydraulic hoses, electrical cables or conduits, and air hoses having a flexible wire rope passing therethrough to which the control lines are attached.

10 Claims, 4 Drawing Figures

SUPPORT SYSTEM FOR FLEXIBLE CONDUITS

BACKGROUND OF THE INVENTION

This invention relates in general to tethers and supports for flexible cables and conduits. More specifically, but without restriction to the particular use which is shown and described, this invention relates to a tether support utilized to control the movement of relatively large, flexible, high-pressure hydraulic hoses, air lines, and electrical conduits or cables which extend between articulated or pivotal portions of a vehicle.

Many large vehicles, especially construction machinery and earth-moving equipment, have structural portions which are relatively pivotal and require high-pressure hydraulic hoses, air lines and electrical conduits or cables to extend between the articulated portions so that a machine operator can control various functions associated with the vehicle or auxiliary and accessory equipment. Since in use portions of the accessory equipment associated with these vehicles are extensively angulated, for functional operations, the vehicle and the auxiliary or accessory equipment are connected by high-pressure hydraulic hoses, electrical cables and air lines which must be configured in a large loop or coil in order to accommodate such angular or pivotal movement without undue hose and cable wear or damage.

The high-pressure hydraulic hoses and cables that are used are highly flexible and, therefore, it is necessary to control the movement of these loops or coils in order to prevent damage caused by stresses due to twisting or tangling and abrasion due to their exposure in close proximity to moving parts. Because of the large sizes of the high-pressure hydraulic hoses, the number of the various electrical cables and air hoses, and the flexible characteristics necessitated in order to accommodate the angular movement between the accessory equipment and the vehicle, these loops are subjected to induced dynamic forces during machine operation which can result in damage to their structural integrity, especially in the area of their connection to couplings where sharp bending can lead to failure. Therefore, it is important to constrain the high-pressure hydraulic hose loops and to control the movement of the various flexible conduits and air hoses which are required to couple the controls on the vehicle with the controlled actuators or the auxiliary and accessory equipment.

Since such high-pressure hydraulic hoses and the other conduits and cables are necessitated to be formed in a large loop, lateral movement in a direction normal to the plane of the loop would cause twisting and possible failure of the hydraulic hose and/or cable members. In addition, radial and axial expansion and contraction of the hydraulic hoses as they respond to internal pressure changes creates additional problems in constraining such hose loops. The hoses and cables must be tethered and supported, but the tether system must not grip the hoses in a manner which could cause localized stresses. The loop must be tethered against undesired lateral movement and must prevent the hydraulic hoses and cables from falling into adjacent moving parts and impacting or abrading against machine parts.

Various attempt have been made to provide a suitable support tether for large loops of control lines such as those set forth in U.S. Pat. No. 3,872,881 and U.S. Pat. No. 3,882,886, which disclose tether systems for control lines extending between portions of an articulated vehicle or pivotally supported vehicle equipment. In the first referenced patent the tether comprises a pair of shallow U-shaped brackets releasably joined at their open ends to form a cage about the flexible conduits. The cage, which may also utilize a solid insert to secure the flexible conduits, is joined to a steel band which extends between anchor points on the vehicle. In the latter referenced patent a non-metallic, flexible support band extends between anchor points on the vehicle. A plurality of flexible straps are secured to the support band to bundle the flexible conduits thereupon.

SUMMARY OF THE INVENTION

It is, therefore, an object of this invention to improve tethers for relatively large, flexible, high-pressure hydraulic hoses, air hoses and electrical cables utilized between articulated or pivotal parts of a vehicle.

Another object of this invention is to constrain the movement of a plurality of high-pressure hydraulic hoses, electrical cables and air hoses joining articulated portions of a vehicle while permitting access to and removal of a discrete hose or cable from the others without disturbing the remaining members.

A further object of this invention is to support flexible fluid conduits and electrical cables joining a pivotal portion of a vehicle with a stationary portion of the vehicle.

These and other objects are attained in accordance with the present invention wherein there is provided a shackle for connection to high-pressure hydraulic hoses and having a flexible wire rope passing therethrough to which electrical cables or conduits and air hoses are attached. The high-pressure hydraulic hoses, air hoses and electrical cables are permitted to move axially relative to the ends thereof and the fluid conduits are permitted to increase and decrease in a radial direction in response to increases and decreases, respectively, in fluid pressure. The hoses, conduits and cables are constrained to prevent damage to their structural integrity due to fouling in adjacent moving parts, impacting against portions of the vehicle or rubbing against stationary components of the vehicle during machine operation.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

DESCRIPTION OF A PREFERRED EMBODIMENT

Figure 1:
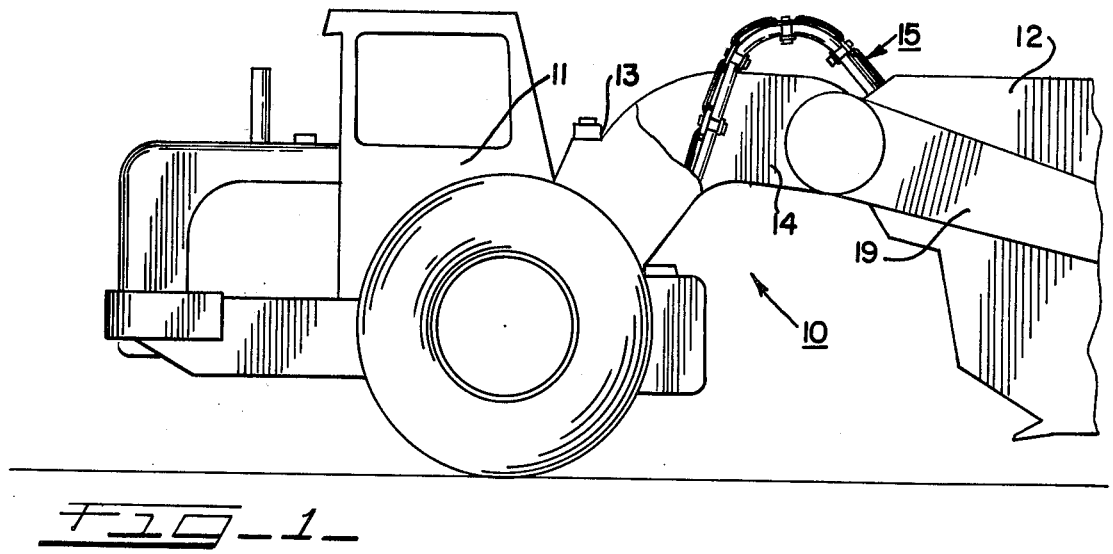
FIG. 1 is a schematic elevation of an earth-moving scraper vehicle embodying the present invention.
Figure 2:
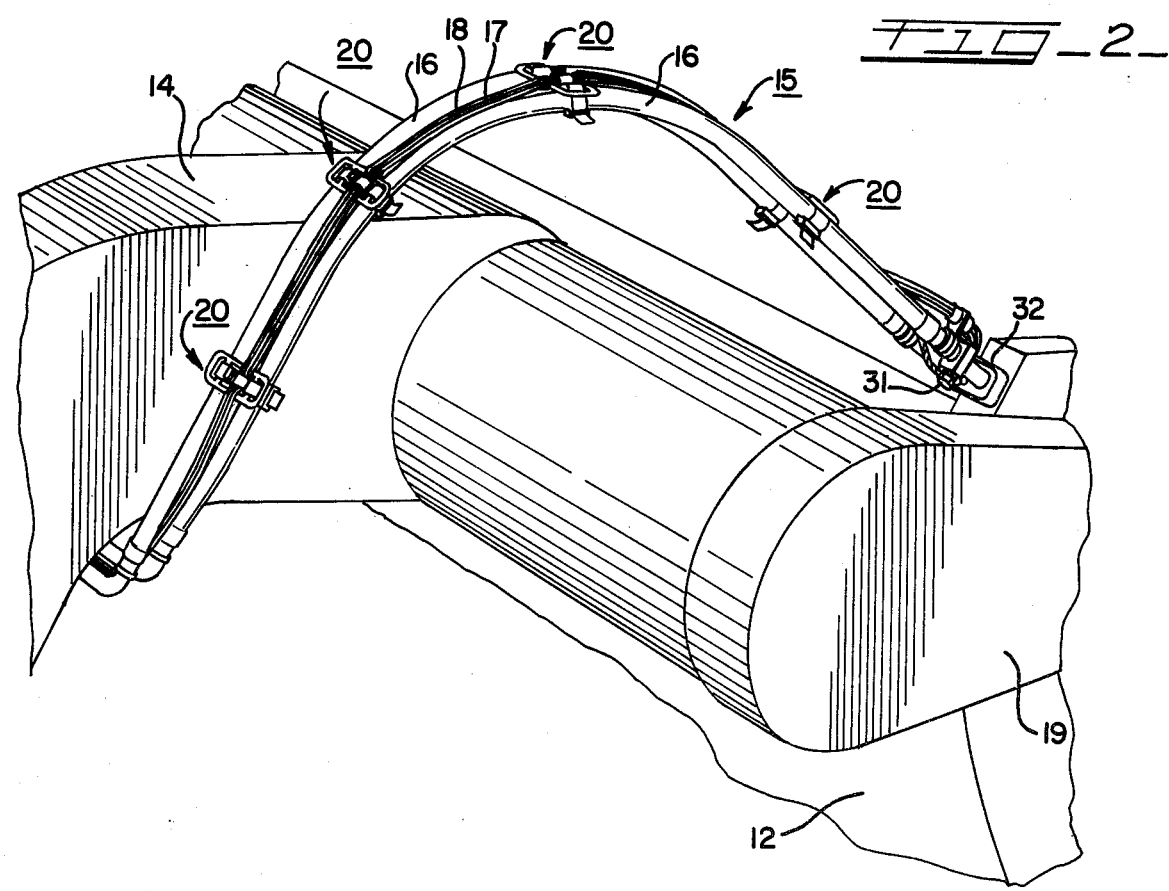
FIG. 2 is an enlarged elevation view of a portion of the vehicle shown in FIG. 1 to better illustrate the high-pressure hydraulic hoses, air hoses and electrical cables utilized to couple the controls on the tractor portion of the vehicle with the controlled actuators on the trailer portion of the vehicle.

Referring now to FIGS. 1 and 2, there is shown an earth-moving vehicle 10 utilized in the construction equipment industry and commonly referred to as a wheeled scraper. The wheeled scraper 10 comprises a draft or tractor unit 11, mechanically joined to a trailer unit, of which a scraper bowl portion 12 is illustrated, by means of a coupling hitch connection 13. A plurality of flexible control lines 15, such as high-pressure hydraulic hoses 16, electrical conduits or cables 17, and air hoses 18 interconnect operator-actuated controls positioned on the tractor unit 11 with actuators carried by the scraper bowl 12 which control various functions.

The trailer unit includes the scraper bowl 12 supported at its rear end by a pair of wheels (not shown) and at its front end by a draft frame 14, commonly referred to as a gooseneck. The draft frame 14 has a pair of rearwardly extending legs 19 pivotally connected to vertical sidewalls of the scraper bowl 12 by a transverse axis about which the scraper bowl pivots. A pair of hydraulic jacks (not shown) interconnect the draft frame 14 with the front or leading portion of the scraper bowl 12 to control the depth of cut of the scraper bowl during loading operation.

In operation, actuation of the jacks and other operator-controlled functions on the trailer unit is effected by the machine operator actuating controls carried on the draft unit 11, and operatively coupled to the jacks and other accessory equipment carried by the scraper bowl, through one or more of the plurality of the control lines 15 which interconnect from the draft frame 14 to the scraper bowl 12. Due to the pivotal movement between the draft frame 14 and the scraper bowl 12, the control lines 15 are conformed in a large loop or coil to accommodate this movement without damage or wear to the control lines. Since these control lines 15 are formed in such large loops, the loops must be constrained or tethered in order to prevent twisting of the control lines and to prevent them from being damaged by contact with other vehicle parts.

Figure 3:
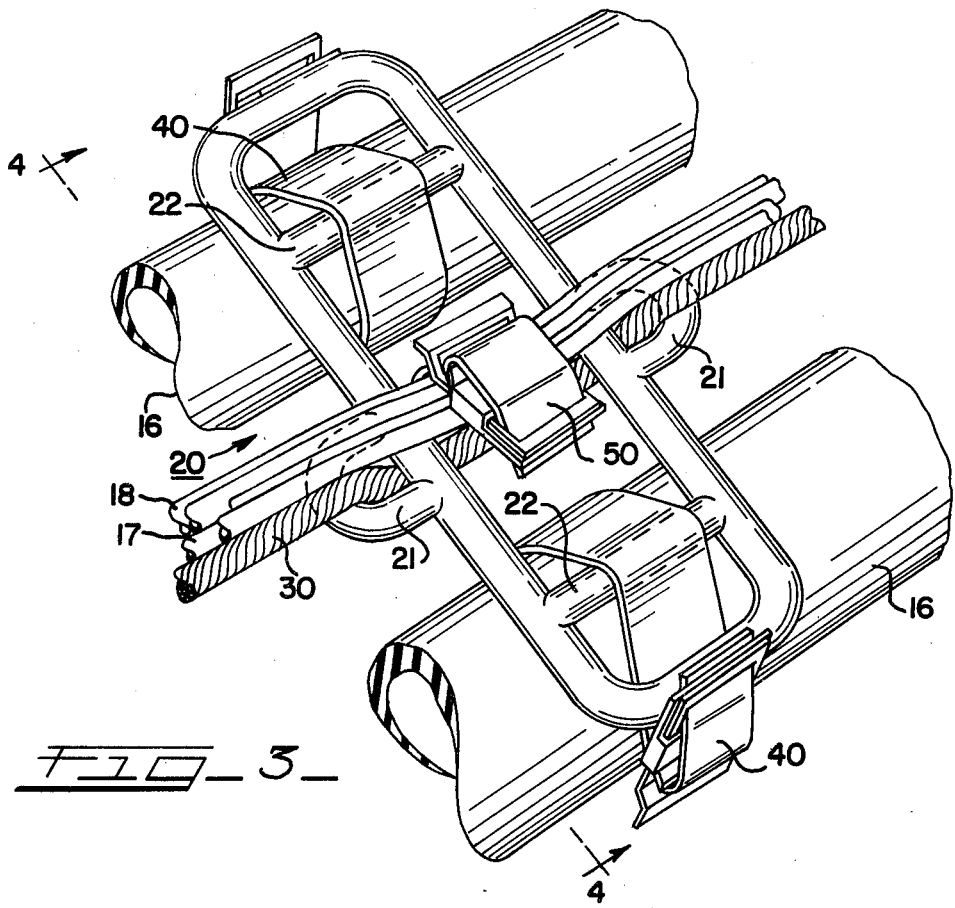
FIG. 3 is a perspective view of a shackle with high-pressure hydraulic hoses, air hoses and electrical cables coupled to a flexible wire rope in the manner of the invention.
Figure 4:
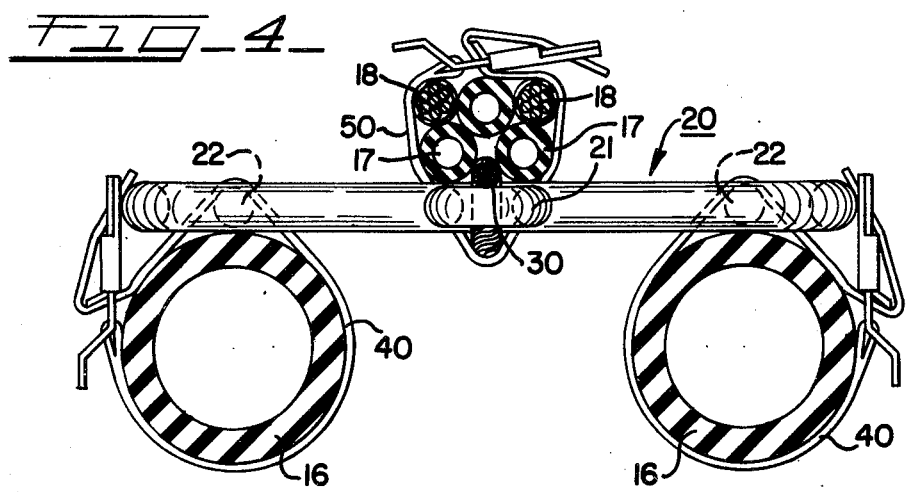
FIG. 4 is a sectional view of the shackle shown in FIG. 3 taken along lines 4—4.

In order to constrain the loop formed by the flexible control lines 15, the hydraulic hoses 16 are secured to a shackle 20 carried upon a plastic covered wire rope 30 which is anchored (31) at each of its ends to portions of the wheeled scraper 10. The shackle 20 is formed as a rigid rectangle having a pair of ears 21 extending outwardly from opposite parallel sides of the rectangle forming closed loops through which the wire rope 30 passes as best shown in FIG. 3. A pair of cross braces 22 extend between opposite parallel sides of the shackle and are positioned between the ear portions 21 and the ends of the shackle for securing the high-pressure hydraulic hoses 16 against the shackle. The wire rope 30 is shown anchored at one end to a hydraulic line suport 32 on the scraper bowl 12 and threaded through the ear portions 21 of the shackle 20. The hydraulic hoses 16 are connected to one side of the shackle 20 by means of adjustable flexible straps 40 which extend about the hydraulic hoses 16 and the cross brace member 22 of the shackle 20 such that the straps may be tightened to releasably restrain the hydraulic hoses 16 against the shackle 20.

The electrical conduits or cables 17 and air hoses 18, which interconnect operator-actuated controls on the tractor unit 11 with the scraper bowl 12, are bundled about the wire rope 30. The electrical conduits or cables 17 and air hoses 18 are supported by the side of the shackle 20 opposite to the hydraulic hoses 16 and releasably secured thereto by means of a plurality of flexible straps or tie downs 50 which sandwich the shackle 20 between the conduit and hoses 17 and 18, and the wire rope 30 to releasably secure these members to the supporting shackle 20. Releasably securing the flexible control lines 15 in this manner permits any individual conduit, cable or hose to be removed for repair, replacement or servicing by merely releasing the tie down or strap 40 or 50. One of the control lines 15 can then be removed or repair without disturbing the others as required.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A support system for a flexible conduit extending between and secured at each end to relatively movable anchoring points comprising
    rigid shackle means for connecting to and constraining the movement of a flexible conduit extending between and secured at each end to relatively movable anchoring points,
    flexible strap means operatively connected to said rigid shackle means for releasably securing such a flexible conduit to said rigid shackle means, and
    non-resilient flexible support means capable of flexure in any plane of movement relative to such relatively movable anchoring points, and secured at each end to said relatively movable anchoring points,
    said non-resilient flexible support means being coupled to said rigid shackle means for supporting and positioning said rigid shackle means relative to said relative movable anchoring points to support a flexible conduit during movement in any plane.

2. The apparatus as set forth in claim 1 wherein said rigid shackle means comprises a rectangular frame having at least two cross braces extending between parallel sides thereof for operative connection to said flexible strap means.

3. The apparatus as set forth in claim 2 wherein said rigid shackle means further includes at least two ears extending outwardly from parallel sides thereof forming closed loops adapted to receive said flexible support means therethrough.

4. The apparatus as set forth in claim 1 wherein said flexible support means comprises a wire rope.

5. The apparatus as set forth in claim 1 further including flexible strap means operatively connected to said flexible support means for securing a flexible conduit thereto.

6. The apparatus as set forth in claim 3 wherein said ears are positioned intermediate the ends of the parallel sides from which they outwardly extend.

7. A support system for a flexible conduit extending between and secured at each end to relatively movable anchoring points including rigid shackle means comprising a rectangular frame having at least two cross braces extending between parallel sides thereof for constraining the movement of a flexible conduit, said rigid shackle means further including at least two ears extending outwardly from parallel sides thereof forming closed loops, and positioned between the ends of the parallel sides from which they outwardly extend and said cross braces extending between said parallel sides from which said ears outwardly extend, flexible strap means operatively connected to said rigid shackle means for releasably securing said flexible conduit to said rigid shackle means, and flexible support means secured at each end to said relatively movable anchoring points and coupled to said rigid shackle means for supporting and positioning said rigid shackle means relative to said relatively movable anchoring points.

8. The apparatus as set forth in claim 7 wherein said cross braces are positioned between said ears and the end of said parallel sides between which said cross braces extend.

9. The apparatus as set forth in claim 3 wherein said flexible support means extends through each of said ears, and further including flexible strap means operatively connected to said flexible support means for securing a flexible conduit thereto.

10. The apparatus as set forth in claim 9 wherein at least one flexible conduit is secured against opposed sides of said rigid shackle means.

* * * * *